(12) United States Patent
McCluskey (10) Patent No.: US 10,989,903 B2
(45) Date of Patent: Apr. 27, 2021

(54) MODULAR SCANNING CONFOCAL OPTICAL PROFILE MICROSCOPY WITH DIGITAL IMAGING PROCESSING

(71) Applicant: WASHINGTON STATE UNIVERSITY, Pullman, WA (US)

(72) Inventor: Matthew Douglas McCluskey, Pullman, WA (US)

(73) Assignee: Washington State University, Pullman, WA (US)

(*) Notice: Subject to any disclaimer, the term of this patent is extended or adjusted under 35 U.S.C. 154(b) by 310 days.

(21) Appl. No.: 16/286,038

(22) Filed: Feb. 26, 2019

(65) Prior Publication Data
US 2019/0293915 A1   Sep. 26, 2019

(51) Int. Cl.
G02B 21/00   (2006.01)
G02B 27/09   (2006.01)
G02B 27/14   (2006.01)

(52) U.S. Cl.
CPC ......... *G02B 21/006* (2013.01); *G02B 21/008* (2013.01); *G02B 27/0955* (2013.01); *G02B 27/0972* (2013.01); *G02B 27/14* (2013.01)

(58) Field of Classification Search
CPC .............. G02B 21/00; G02B 21/0004; G02B 21/0016; G02B 21/0024; G02B 21/008; G02B 21/06; G02B 21/36; G02B 21/006; G02B 27/0955; G02B 27/0972; G02B 27/14; G02B 21/0076; G02B 21/0048; G02B 21/365; G02B 21/0032
See application file for complete search history.

(56) References Cited

U.S. PATENT DOCUMENTS 6,038,067 A * 3/2000 George .............. G02B 21/0028
                                                          359/368

OTHER PUBLICATIONS

Ye. et. al. ("Modular scanning confocal microscope with digital image processing", Plos one 11, pp. 1-14, Nov. 2016) (Year: 2016).*

* cited by examiner

*Primary Examiner* — Robert E. Tallman
(74) *Attorney, Agent, or Firm* — W&C IP (57) ABSTRACT

A modular confocal microscope includes a beam steering means arranged to direct the source of electromagnetic radiation non-collinearly with the optical axis of a focusing lens. The focused non-collinearly directed source of electromagnetic radiation is used for an imaging basis of targeted one or more sites of a specimen. An arrayed detector is configured along a beam path in a conjugate confocal plane to the targeted one or more sites of the specimen. The arrayed detector is also configured to provide autocorrection information to maintain focus and image quality of the targeted one or more sites using the imaging basis. The arrayed detector provides high-throughput configured synthetic apertures in a pixel range array of N=2×2 up to an array of N=21×21.

22 Claims, 6 Drawing Sheets

MODULAR SCANNING CONFOCAL OPTICAL PROFILE MICROSCOPY WITH DIGITAL IMAGING PROCESSING

GOVERNMENT INTERESTS

This invention was made with government support under DMR1561419 awarded by National Science Foundation. The government has certain rights in the invention.

FIELD OF THE INVENTION

The present embodiments herein relate to rapid and highly precise imaging and/or detection of artifacts using a confocal microscope. In particular, the present embodiments using the confocal microscope arrangements and techniques disclosed herein, are directed to wide-field imaging, artifact detection, and conditioning of materials which exhibits persistent photoconductivity.

BACKGROUND OF THE INVENTION

Discussion of the Related Art

Confocal laser scanning microscopy (CLSM) is a mature technology that is used widely in the life sciences. It has been used to obtain detailed information about cells, tissue, microbial biofilms, and brain slices. Labelling cells with fluorescent dyes is a preferred technique for providing optical imaging contrast. In addition to biomedical research, confocal microscopes have clinical potential to detect corneal diseases, skin cancer,[i] and other conditions.

A beneficial aspect of CLSM is the ability using such an instrument to reject out-of-focus light, resulting in crisp, high-resolution images. With a widefield fluorescence microscope, a broad area of the specimen is illuminated. A photon emitted from one region of the specimen may scatter or diffuse to another location and be collected by the camera. This results in "haze" that can obscure important details. CLSM solves the problem of fluorescence blurring by, for example, scanning a laser across the specimen, point-by-point, and reconstructing an image from the collected data. Moreover, for 3-Dimensional (3D) applications, out-of-focus features also add a blurry haze to each image plane resulting in a reduced contrast.

High-quality images produced by such a technique come at a cost—typically over $200 k for a single microscope. A major expense in a scanning arrangement is the scanning/de-scanning system that steers the laser to the sample and guides the emitted light back to the detector. Optical components must be aligned to tight tolerances. In addition, the detector (typically a photomultiplier tube, or PMT) requires a high-voltage power supply. High-end confocal microscopes are ubiquitous at biomedical research facilities but are out-of-reach for many individual investigators, small companies, or undergraduate institutions. Furthermore, the microscopes are not portable, limiting their use in the field or confined spaces.

The CLSM is also inherently slow because a digital image is built up point by point as a small focused laser beam is scanned across the specimen. For example, in such scanning optical arrangements, as implemented currently, the acquisition time is roughly 15 min for a 200×200 point image. While this is generally not a problem for generating spectroscopic maps, which require long integration times to obtain sufficient signal-to-noise ratios, for most biomedical imaging applications, however, the scanning time is not desirable when high throughput is a necessary aspect.

Background information on a Confocal Laser Scanning Microscopy system, is described and claimed in U.S. Pat. No. 9,891,422 entitled "Digital Confocal Optical Profile Microscopy," filed Sep. 5, 2013, to Mathew D. McCluskey, including the following, " . . . certain confocal microscopes can have higher optical resolutions than wide-field microscopes. However, such confocal microscopes have several drawbacks. For example, the pinhole in such confocal microscopes acts as an analog computer that applies a circular aperture function to light signals coming from the sample. The pinhole allows in-focus light signals to pass through but rejects out-of-focus signals, which may carry a great deal of information about the sample. As discussed in more detail below, several embodiments of the present technology monitor substantially the entire beam profiles of light signals from a sample. The monitored beam profiles can be modeled to yield additional and/or more accurate information about the sample than existing confocal microscopy."

Another technology to address aforementioned time acquisition and throughput problems is Scanning Disk Confocal Microscopy (SDCM) which uses a spinning micro-lens array to focus the light into an aligned spinning pinhole disk array. As the coupled microlens array disk and pinhole array disk are spun at about 5000-10,000 rpm, a Field-of-View (FOV) will spend some time illuminated with a focused laser beam spot. In an application, fluorescence is excited and imaged from multiple points across the sample simultaneously.

However, problems exist where rotation of the spinning disk and the camera exposure time are not coupled so that all locations within the FOV receive an equal number of laser beam exposures during the camera exposure time, resulting in image artifacts. Moreover, the presence of multiple pinholes on the pinhole array disk results in out-of-focus light from other focal planes entering adjacent pinholes. This compromises z axis resolution and makes the SDCM inferior to the CLSM for z resolution. Another undesirable aspect of CLSM is that multicolor applications can get complicated with the need for multiple cameras, dichroic mirrors, and filter wheels. A single camera can be employed, and filter wheels can switch rapidly to excite and detect different fluorophores sequentially, but this precludes rapid acquisition of multiple probes.

Background information on a scanning disk Confocal Microscope system that discloses a microlens array disk coupled to a pinhole array disk to focus the light into the pinholes is described and claimed in U.S. Pat. No. 5,162,941 entitled "Confocal Microscope," filed Jul. 23, 1991, to Favro et al., including the following, " . . . the present invention provides a confocal microscope comprising a light source for illuminating a portion of a specimen and an aperture plate disposed between the light source and the specimen. The aperture plate includes an aperture for passing a portion of the light emanating from the light source onto a portion of the specimen. Means is disposed between the light source and the aperture plate for focusing a portion of the light onto the aperture of the aperture plate. Objective means is disposed between the aperture plate and the specimen for focusing the light passing through the aperture onto the specimen for illuminating a portion of the specimen. Means, optically coupled to the illuminated portion of the specimen, is provided for collecting an image created by the light illuminating a portion of the specimen. By focusing a portion of the light onto the aperture of the aperture plate, most of the light directed toward the aperture plate passes through the aperture plate therefore increasing the transfer efficiency of light through the aperture plate. In a preferred embodiment of the present invention, the focusing means includes a Fresnel zone plate. In an alternative embodiments, the focusing means includes a Fresnel lens, microlens, or a microfunnel concentrator."

Additional background information on a Confocal Microscope system that discloses micro-lens arrays coupled to a pinhole array disk is described and claimed in U.S. Patent Application No. 2005/0094261 A1, entitled "Two Microlens Arrays And a Pinhole Diaphragm Array," filed Nov. 3, 2004, to Hell et al., including the following, "A confocal microscope comprises a microlens array having a plurality of microlenses for splitting a ray bundle of illumination light into a plurality of convergent partial ray bundles which illuminate a sample simultaneously at several measuring points; a beam splitter for separating a beam path of the illuminating light and a beam path of sample light originating from the illumination of the sample and captured in an inverse direction with regard to the illumination light; a pinhole diaphragm array having a plurality of pinhole diaphragms arranged in the beam path of the sample light and corresponding to said microlenses of said microlens array splitting the illumination light; and a further microlens array having a plurality of microlenses corresponding to said microlenses of said microlens array splitting the illumination light. Said microlenses of said microlens array splitting the illumination light and said microlenses of said further microlens array are arranged in the beam path of the sample light. Said beam splitter is arranged in an area between said microlens array splitting the illumination light and said further microlens array; and said pinhole diaphragms of said pinhole diaphragm array are not arranged in the area between said microlens array splitting the illumination light and said further microlens array."

Another technology to address aforementioned time acquisition and throughput problems is grid confocal microscopy, a technique often referred to as structured illumination microscopy (SIM), a widefield method that does not involve lasers or scanning. Such a system/methodology relies on the placement of a movable grid pattern in the excitation light path between the light source and the sample so as to project a grid pattern onto an image plane. Three images of the fluorescent sample are recorded with the grid of horizontal lines in 3 different positions. A calculation removes the out-of-focus light, leaving behind a single image containing only the in-focus information. A "regular" wide-field image can also be computed by summing the 3 images together.

However, limitations of such a method is slow, the grid patterns necessary for the computations can be lost in a haze when the samples are thicker, artifacts often persisting due to underlying residual grid patterns in the images, and because images are subtracted, such a method/system is prone to noise. Moreover, because the method relies on 3 sequential images to generate a single confocal slice, the methodology is not suitable for fast dynamic live-cell imaging where the sample can move in the time between each of the 3 image frames.

Accordingly, a need exists for a portable Confocal Optical Microscopy system with novel aspects apart from those discussed above and of which is capable of providing wide-field high-quality images with a high throughput. In addition, the embodiments herein and corresponding methods exploits the benefits of confocal microscopy at a price point that is much lower than current systems. Unlike high-end CLSMs, it is portable, has a small footprint, and minimizes the number of moving parts. The embodiments herein are directed to such a need.

BRIEF SUMMARY OF THE DISCLOSURE

In a first aspect, a modular confocal microscope is disclosed that includes: a source of electromagnetic radiation; a beam steering means arranged to direct the source of electromagnetic radiation non-collinearly with the optical axis of a focusing lensing means configured within the modular confocal microscope, wherein the focused non-collinearly directed source of electromagnetic radiation is used for an imaging basis of targeted one or more sites of a specimen; and at least one arrayed detector configured along a beam path in a conjugate confocal plane to the targeted one or more sites of a specimen and further configured to provide autocorrection information to maintain focus and image quality of the targeted one or more sites using the imaging basis, and wherein the arrayed detector provides high-throughput configured synthetic apertures in a pixel range array of N=2×2 up to an array of N=21×21; and a processor coupled to the at least one arrayed detector configured to determine 2-dimensional and/or 3-dimensional properties of the targeted one or more sites of the specimen.

In a second aspect of the invention, a modular microlens array confocal microscope is disclosed that includes: a source of electromagnetic illumination; a microlens array arranged to receive the source of electromagnetic illumination, wherein the received source of electromagnetic illumination is reconfigured by the microlens array into a plurality of sub-beams running adjacently along a first beam path; an optical lensing means configured to collect and focus the plurality of sub-beams at a plurality of sites at a target, wherein the optical lensing means thereafter collects and directs along a second beam path, an induced reflectance and/or emission from each of the plurality of targeted sites; at least one arrayed detector configured along the second beam path and further configured to image the resultant multiple sites via the induced reflectance and/or emission provided by the signals from the focused plurality of sub-beams, and wherein the arrayed detector provides high-throughput configured synthetic apertures in a pixel range array of N=2×2 up to an array of N=21×21; and a processor coupled to the at least one arrayed detector and configured to determine 2-dimensional and/or 3-dimensional properties of the target.

In a third aspect of the invention, a process for conditioning a material using a modular confocal microscope is disclosed that includes: incorporating a modular confocal microscope for simultaneously imaging and conditioning one or more targeted sites of a specimen that exhibits persistent photoconductivity, wherein the modular confocal microscope includes: a source of electromagnetic radiation; a beam steering means arranged to direct the source of electromagnetic radiation non-collinearly with the optical axis of a focusing lensing means configured within the modular confocal microscope, wherein the focused non-collinearly directed source of electromagnetic radiation is used for an imaging basis of targeted one or more sites of a specimen; and at least one arrayed detector configured along a beam path in a conjugate confocal plane to the targeted one or more sites of a specimen and further configured to provide autocorrection information to maintain focus and image quality of the targeted one or more sites using the imaging basis, and wherein the arrayed detector provides high-throughput configured synthetic apertures in a pixel range array of N=2×2 up to an array of N=21×21; and a processor coupled to the at least one arrayed detector configured to determine 2-dimensional and/or 3-dimensional properties of the targeted one or more sites of the specimen; selecting a predetermined emission spectrum provided by the source; irradiating an initial contact point via the confocal geometry of the confocal modular microscope; and while maintaining the irradiation, translating the specimen so as to delineate a path of exposure of the specimen to the irradiation.

Accordingly, as disclosed herein, the embodiments provide for wide-field high-quality images with a high throughput. In addition, the embodiments herein and corresponding methods exploits the benefits of confocal microscopy at a price point that is much lower than current systems. Unlike high-end CLSMs, it is portable, has a small footprint, and minimizes the number of moving parts.

DETAILED DESCRIPTION OF MODES OF PRACTICING THE DISCLOSURE

In the description of the invention herein, it is understood that a word appearing in the singular encompasses its plural counterpart, and a word appearing in the plural encompasses its singular counterpart, unless implicitly or explicitly understood or stated otherwise. Furthermore, it is understood that for any given component or embodiment described herein, any of the possible candidates or alternatives listed for that component may generally be used individually or in combination with one another, unless implicitly or explicitly understood or stated otherwise. Moreover, it is to be appreciated that the figures, as shown herein, are not necessarily drawn to scale, wherein some of the elements may be drawn merely for clarity of the invention. Also, reference numerals may be repeated among the various figures to show corresponding or analogous elements. Additionally, it will be understood that any list of such candidates or alternatives is merely illustrative, not limiting, unless implicitly or explicitly understood or stated otherwise. In addition, unless otherwise indicated, numbers expressing quantities of ingredients, constituents, reaction conditions and so forth used in the specification and claims are to be understood as being modified by the term "about."

Accordingly, unless indicated to the contrary, the numerical parameters set forth in the specification and attached claims are approximations that may vary depending upon the desired properties sought to be obtained by the subject matter presented herein. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the subject matter presented herein are approximations, the numerical values set forth in the specific examples are reported as precisely as possible. Any numerical values, however, inherently contain certain errors necessarily resulting from the standard deviation found in their respective testing measurements.

General Description

A beneficial embodiment disclosed herein is a modular scanning confocal microscope which uses a CCD camera to replace the physical pinhole for materials science applications. The data collected by the CCD were processed to yield images of the specimen. By selecting effective pixels in the recorded CCD images, a virtual pinhole is created.

Another beneficial embodiment disclosed herein that is also separate and apart from conventional Confocal microscope configurations is a modular optical confocal microscope which uses a CCD camera to replace the physical pinhole for materials science applications but that also incorporates a fixed microlens array to split the laser into an array of spots that are focused onto the specimen to enable, for example, wide field scanning/imaging at a high throughput.

Another novel aspect of the embodiments herein is that for any of the disclosed embodiments, the input source light (e.g., laser source light) used for illumination/imaging can be directed slightly (e.g., up to about a degree) non-colinearly with respect to the optical axis of the objective lens so as to initiate imaging of the specimen/sample being interrogated/conditioned. Because of such a configuration, a sample plane originally so imaged but thereafter translated and/or titled will result in images that exhibit defocusing and translation in (x,y) as exhibited in pixel number(s) at the configured CCD array. Such a novel technique is beneficially used by the microscope configurations herein to maintain focus and mitigate data collection imperfections. In particular, if the initially imaged site of the sample for any reason translates (e.g., in a plane that moves in the Z-direction with respect to for example, the confocal microscope focusing objective) or if during scanning, the surface of the scanned area is uneven, such events can be autocorrected so as to maintain proper focus and thus imaging in real time by monitoring pixel offsets and signal intensity drop-off, often due to defocusing while the microscope is in operation.

In all of the disclosed embodiments, the methodologies and corresponding system(s) disclosed herein thus represent a bridge between widefield and confocal microscopy. Beneficial aspects thus include not only reflectance imaging but also imaging of induced fluorescent light emitted by a specimen as collected by an aligned CCD array operating at where normally a hard pinhole would be located in a typical confocal geometry.

In addition, while the configurations herein are beneficial for two-dimensional imaging, the embodiments herein are equally capable of 3-Dimensional optical sectioning, wherein the rendering of images in thin uniform layers can be digitally stacked into three-dimensional representations of a desired object(s). An example of such a methodology, using embodiments herein, includes the capability of imaging biological specimens that have been treated with a fluorescent dye or are that have been genetically modified to fluoresce upon proper illumination.

While reflectance and fluorescent imaging are preferred embodiments herein, it is also to be appreciated that the embodiments herein can be utilized for optical imaging and processing/conditioning materials herein without departing from the spirit and scope of the overall invention. For example, the embodiments herein can process/condition particular wide bandgap (greater than 2.9 eV) materials that exhibits Persistent Photoconductivity (to be discussed in detail below) while simultaneously imaging the target to ensure proper photon inscribed areas. Such Persistent Photoconductivity materials that persists for at least a year and often persists permanently often includes Strontium titanate ($SrTiO_3$ or STO) but can also can include a variety of other oxide materials, such as but not limited to zinc oxide (ZnO). It is also to be noted that III-V semi-conductor materials, such as, for example, gallium nitride (GaN), gallium indium nitride arsenic (GaInNAs), and gallium arsenic (GaAs) can also be conditioned/processed, as disclosed herein.

Specific Description

Figures 1A, 1B:
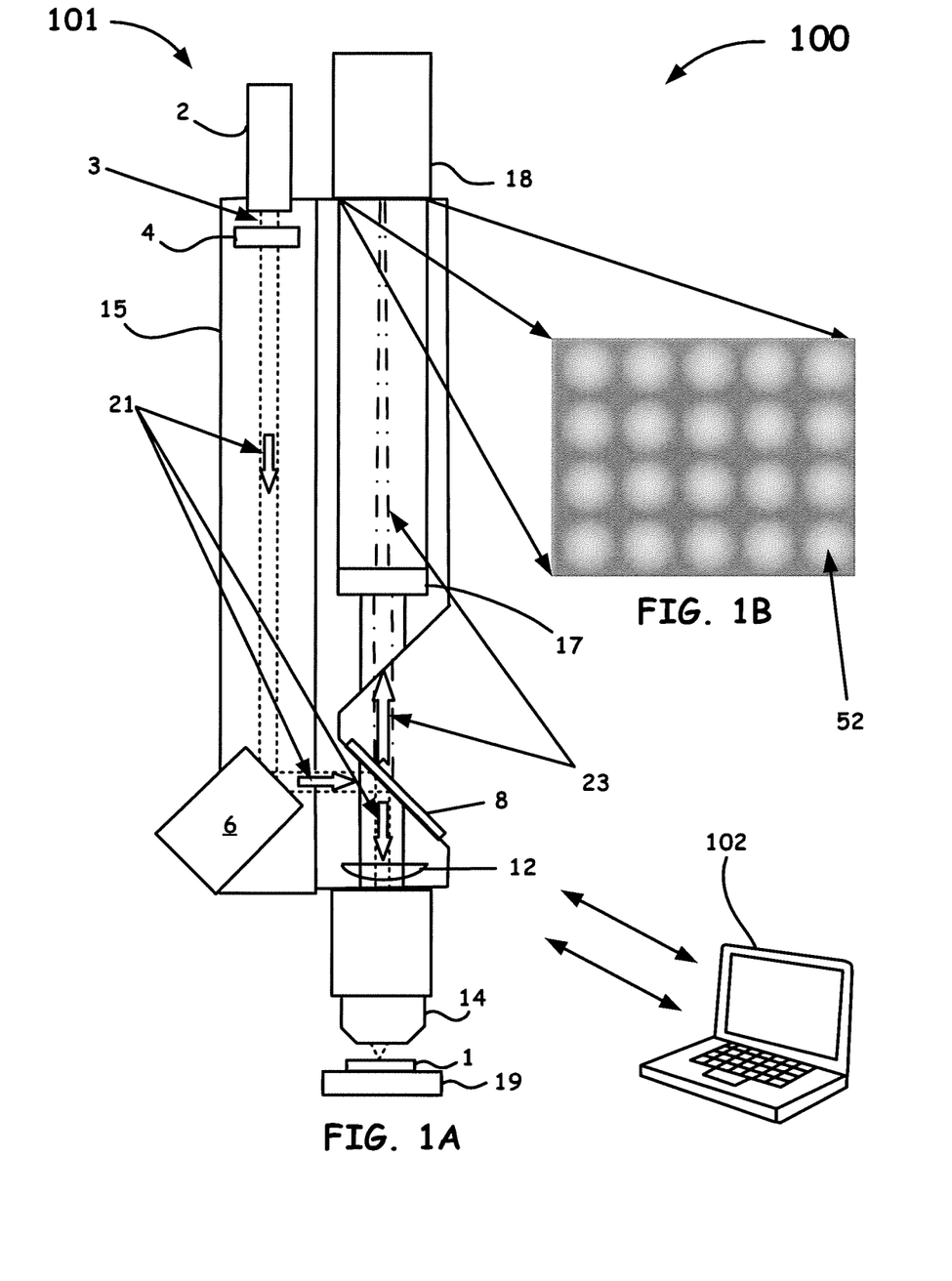
FIG. 1A illustrates an example embodiment of a modular microlens array confocal optical microscope (COP) system with digital image processing.
FIG. 1B shows fluorescence laser induced spots imaged by a CCD array operating as a synthetic aperture(s).

Turning now to the drawings, FIG. 1A is a general schematic diagram of a modular microlens array confocal optical microscope (COP) system with digital image processing, generally referenced by the numeral 100, in accordance with embodiments of the present invention. As shown in FIG. 1A, the COP microscope system 100 of FIG. 1A includes an electromagnetic source 2, at least one lens system 4, a first steering mirror 6, a dichroic mirror 8, a relay lens 12 (tube lens), an objective lens 14, a optical filter 17, and a detector 18, often a two-dimensional charge coupled array detector (CCD) (e.g., a DMK 640×480 pixel array, with 8 bit dynamic range, pixel size 5.6 microns by 5.6 microns), to include complementary metal-oxide-semiconductor ("CMOS") detectors, etc., and a controller/processor 102 to aid a user in manipulating the system 100. As an example working embodiment, the microscope is approximately 1.5 ft. (46 cm) tall with a footprint less than 1 sq. ft. (30×30 $cm^2$). As another arrangement, a red LED is used for widefield transmission (not shown). The beam splitter 318 can include an uncoated optical components, a coated spitter (e.g., an e-beam deposited layered coating(s) splitter or any layered coated optic to provide for multiwavelength selectivity (e.g., a dichroic)), a cube splitter, a half-silvered mirror, a prism, and/or other suitable components.

In the illustrated embodiment, a controller/processor 102 communicates with the microlens array confocal optical microscope (COP) 101 (as also denoted by the double arrows). The controller/processor 102 can include a network server, a desktop computer, and/or other suitable computing devices of various circuitry of a known type, such as, but not limited to, by any one of or a combination of general or special-purpose processors (digital signal processor (DSP)), firmware, software, and/or hardware circuitry to provide instrument control, data analysis, etc., for the example configurations disclosed herein.

It is to be noted that in using such example computing devices, it is to also to be appreciated that as disclosed herein, the incorporated individual software modules, components, and routines may be a computer program, procedure, or process written as source code in C, C#, C++, Java, and/or other suitable programming languages. Image processing and data analysis often is done in MATLAB® and Origin®. The computer programs, procedures, or processes may be compiled into intermediate, object or machine code and presented for execution by any of the example suitable computing devices discussed above. Various implementations of the source, intermediate, and/or object code and associated data may be stored in one or more computer readable storage media that include read-only memory, random-access memory, magnetic disk storage media, optical storage media, flash memory devices, and/or other suitable media. A computer-readable medium, in accordance with aspects of the present invention, refers to media known and understood by those of ordinary skill in the art, which have encoded information provided in a form that can be read (i.e., scanned/sensed) by a machine/computer/processor and interpreted by the machine's/computer's/processor's hardware and/or software. It is also to be appreciated that as used herein, the term "computer readable storage medium" excludes propagated signals, per se.

It is be noted that any of the components listed above are often either contained in a housing 15 or coupled to the housing 15 to protect particular components from contamination and/or for coupling purposes so as to have an integrated and compact system that has ease of transport and installation. It is also to be noted that while the component by component description of system 100 of FIG. 1A is beneficial for illustrative purposes, it is to be understood that other alternative commercial and custom configurations and having various other components shown (see FIG. 3A discussion for example components), as known and as understood by those in the field of optical microscopy/spectroscopy, can also be incorporated when using the particular embodiments disclosed herein.

In more detail with respect to those components noted above, the electromagnetic source 2 is often a substantially configured a monochromatic source, more often a laser source (hereinafter 4), such as a tunable laser source, but can also be a light emitting diode, a halogen lamp, a mercury lamp, and/or any other suitable types of light source (e.g., a white light source) configured (e.g., via filtering) to produce an illumination beam configured so as to provide the necessary intensities and with a desired frequency band for particular applications (imaging, fluorescence, etc.). In an exemplary non-limiting fluorescence application, the laser source 2 is often but not necessarily a green laser beam (e.g., a laser diode of 4.5 mW at 532 nm wavelength) configured to be received by a lens system 4, often of which is a microlens array (hereinafter 4).

Figure 2A:
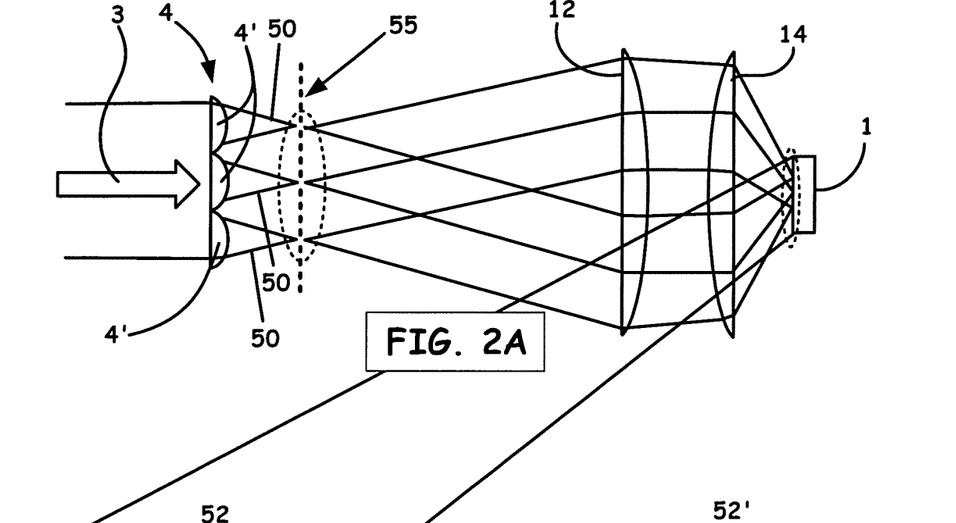
FIG. 2A illustrates the microlens array concept of splitting the source (i.e., laser) into an array of spots that are focused onto a specimen.
Figure 2B:
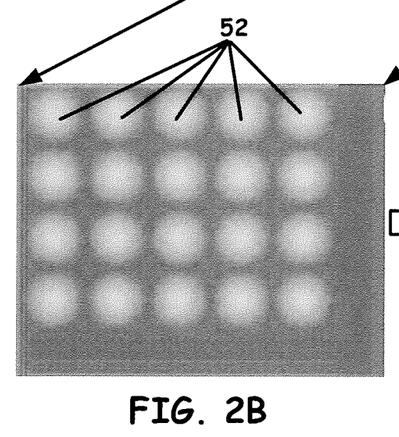
FIG. 2B shows fluorescence spots resultant from the microlens array imaged by the CCD array.
Figure 2C:
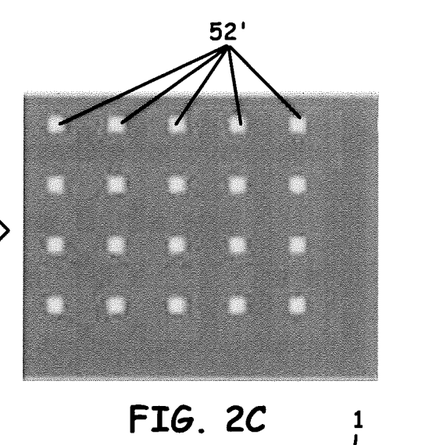
FIG. 2C shows the fluorescence spots resultant from the microlens array converted to intensity values.
Figure 2D:
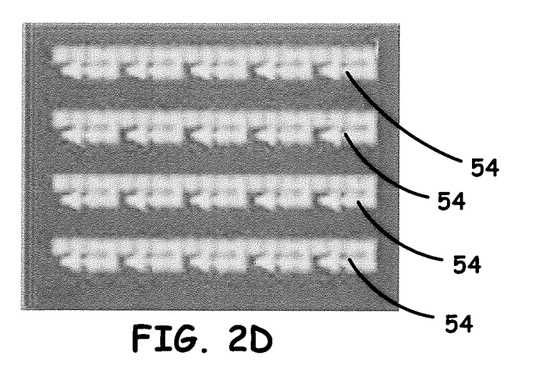
FIG. 2D shows the scanning of the of the laser array illumination spots.

By analyzing the CCD image, the emission features arising from each laser spot are often converted into intensity values 52' (pixels), as shown in FIG. 2C. Also, FIG. 2D shows the laser array being scanned 54 either by way of scanning the steering mirror 6 (e.g., a piezo scanning mirror), or by manipulating the x-y-z stage 19 shown in FIG. 1A in an appropriate stepping fashion that is sub-increments of the pitch of the sub-lenses 4'. The laser array is scanned across the specimen such that each (x,y) point is covered. Such an approach for this illustrative non-limiting example effectively performs ~100 pinhole/detector (for a 4×5 grid) measurements in parallel, enabling acquisition times on par with high-end confocal systems.

Figure 2E:
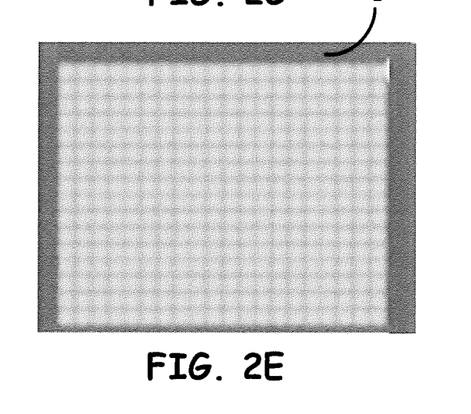
FIG. 2E shows the how the image after the entire specimen is covered.

It is to be noted however that an additional arrangement can include a piezoelectric objective scanner for vertical scanning and a piezoelectric nano-positioning stage for lateral scanning and/or z scanning when desired. Also, while the x-y-z stage 19 is often a motorized linear stage configuration (e.g., stepper motor driven linear stages), manual positioning is also available in combination with motorized positioning for large area translation. An example stepping maneuver using stages known and understood by those of ordinary skill in the art, is about 0.1 microns laterally but can also be any larger step increment depending on the illumination properties provided to the specimen 1 via the beam conditioning, collection and focusing optics, e.g., relay lens 12, objective lens 14, and the mirolenses 4' lens array (e.g., array 4' diameters, f#, etc.). FIG. 2E shows the result of the entire specimen 1 surface resultantly covered.

Thereafter, the array of illuminated unique targets provides optical information (e.g., imaging information due to reflectance (i.e., imaging the source 2 laser spots) and/or fluorescence) directed along a return path 23 through the objective lens 14, the relay lens 12, the dichroic splitter 8 configured to transmit the wavelength of interest, through often one or more windows (not detailed) in the housing 15, one or more bandpass filters 17 and then to respective pixels on the CCD detector 18.

The coupled array detector (CCD) 18 is to be noted as capable of being configured with a detection area designed to be equal to or larger than a cross-sectional area of a received beam signal or the area that encompasses the plurality of beam signals at the photo detector 18. Often, the area itself for the detector is at least 5 times greater than the area of a received beam signal or plurality of beam signals. The detector 18 may also be configured with motorized control (e.g., stepper control (not shown)) so as to move along at least one of an x-, y-, or z-axis such that the detector 18 can maximize imaging of a specimen 1 in a confocal manner. However, it can also be spaced apart from the designed focal imaging plane provided by system 100 for other desired techniques. As a result, a fraction of the detection area of the photo detector 90 and 70 filled by the signal beam may be increased to a target value (e.g., about 0.01, about 0.02, about 0.03, about 0.04, about 0.05, about 0.06, about 0.07, about 0.08, about 0.09, or about 1.0).

In operation, the controller 102, (via a user or via automatic control) causes the illumination source 2 to produce the illumination beam 3. The microlens array 4 is thereafter configured to receive the laser source 2 beam 3, as generally shown in FIG. 1A. The microlens array 4 often is a configured two-dimensional (2D) grid of sub-lenses 4' (microlenses), more often a 4×5 grid wherein each of the of sub-lenses 4' (lenslets) modifies the initial wave front by the laser source 2 into an array of spots (e.g., 52). Example dimensions of the individual lenses 4' include at least one dimension (e.g., a diameter) ranging from microns up to tens of microns.

For a better understanding of the role of the microlens array 4 in the system 100 operation, FIG. 2A, FIG. 2B, FIG. 2C, FIG. 2D, FIG. 2E is instructive of this aspect. In particular, the microlens array 4 grid pattern splits the laser into a corresponding array of spots (sub-beams 50 (see FIG. 2A)) that are focused onto a specimen 1 so as to result in the final received imaged spots 52, 52' of FIG. 2B, FIG. 2C. FIG. 2B in particular shows the resultant 4×5 (one row denoted for simplicity) to grid of resultant confocal illumination areas to induce the fluorescence spots 52 shown as imaged by the array detector 18.

Even more specifically, each respective sub-lens 4' provided by the microlens array 4 focuses (shown within the dashed ellipse) its collected amount of source 2 light to a designed focal plane 55 (also denoted within the dashed ellipse) that in this example embodiment, corresponds to a focal plane for a configured relay lens 12 having the appropriate lens diameter for total light collection directed by the microlens array 4'. However, while a relay lens is beneficial, the embodiments herein can also include any compound optical arrangement known in the art to result in the overall desired effect. The bottom line is that the wave front by the beam source 2 is modified by each respective sub-lens 4' (lens-let) configured within the microlens array 4 into an array (grid pattern) of spots (e.g., 52), acting as separate channels that are directed along an initial beam path 21.

For illustrative purposes of an embodiment herein, FIG. 1B shows a number of fluorescence final received images (spots 52) resultant from being illuminated by a 4×5 grid of sub-beams 50 (see FIG. 2A). However, it is also to be understood that the number of sub-beams 50 provided by a particular microlens array 4 is not just limited to a grid (i.e., a framework) of 20 but can include a number of grid frameworks of at least 2 up to 20 or even greater than 20 where desired.

For an even better understanding of the microlens array 4, each configured sub-lens 4' forms a separate channel so as to operate as a new source and because of the array (grid) configuration, the individual separate channels are at spatial distance so as to avoid interference effects (cross-talk), the result of which is in operation like a plurality of confocal microscopes running adjacently to one another to ultimately result in separate unique illumination sites and thus separate imaging channels. Thus, after passing therethrough the microlens array 4, the adjacent separate channels directed along beam path 21 are received and redirected by the steering mirror 6 (e.g., a piezo scanning mirror), to the dichroic component 8 (often a long-pass dichroic mirror for fluorescence applications), so as to ultimately be received and directed by the objective 14 to illuminate specimen 1 at unique sites.

In a fluorescence example embodiment, the specimen 1 that was utilized to demonstrate a working embodiment was labeled with a red dye that fluoresces in the 600-750 nm range. While fluorescence is discussed for this illustration, it is also to be appreciated that reflectance from a specimen 1 target (i.e., source 2 illuminated regions) could also be performed when desired. Accordingly, upon the specimen 1 being illuminated at a plurality of unique targets provided by the grid of sub-beams 50 at the excitation wavelength(s) (e.g., 532 nm), an emission resulting from substantially this particular dye resulted in an induced fluorescence of between 600 nm to 750 nm, as shown for example by the image of FIG. 1B. Thereafter, the induced emission was recollected via the confocal geometry of the microscope objective 14, then the emission rays were redirected by the relay lens 12 to pass through the dichroic mirror 8 and a filter 17 (e.g., an edge filter, notch filter, etc.) that further attenuates this particular emission band so as to mitigate undesired signals. The allowed emission band (e.g., 600 nm to 750 nm) through filter 17 is then desirably imaged (shown as the grid spots in FIG. 1B) onto the CCD, often of which is positioned at a plane that normally houses a hard pinhole aperture in a standard confocal microscope type of geometry.

With respect to the dichroic mirror 8, it is to be appreciated that while the optical component is in a fixed operation (i.e., designed for particular reflectance and transmission optical frequency bands), the dichroic mirror and even the filter 17 can, if desired by an operator/consumer, be replaced with an Acousto-Optical Beam Splitter (AOBS) and associated drive electronics (not shown) to provide greater compactness when single parameter fluorescence and sophisticated multichannel imaging is a preferred mode of operation for any of the embodiments herein, without changing dichroic mirrors. In such an example configuration/operation, a user selects a set of colors for excitation from a particular source 2 using the controller/processor 102. Thereafter the controller/processor 102 can automatically based on programming, manipulate the AOBS to direct lines onto the specimen 1 and transmit, for this non-limiting embodiment, the fluorescence emission desired. Such AOBS component can also be utilized for reflectance arrangements as well. Accordingly, in this embodiment, different emitting fluorophores using, for example, different illumination wavelengths (e.g., using a tunable laser or a high intensity white light source), can be imaged rapidly without deleterious delay.

As another example arrangement, such array of imaged spots 52 can also thereafter be accurately fitted to Gaussian functions. Another option, which emulates the operation of a conventional CLSM, is to define a virtual pinhole at each array point. For example, although a retractable hard pinhole arrangement (not shown) amounting to a design that matches the grid pattern of illumination can be utilized, a virtual pinhole at each array point preserves the collection of substantially all of the photons, which is beneficial in especially fluorescence arrangements where every photon is coveted.

In particular, the CCD can be configured to operate as a plurality of virtual synthetic pinholes so that the maximum number of emission photons can be collected so as to improve the signal to noise ratio (SNR) and in a high throughput manner because of the use of fast CCD time acquisition architectures. If S/N is still deficient, one can also increase source 2 illumination power and/or utilize better light-sensitives cameras, such as for example, EMCCD and sCMOS technologies. For example, the sCMOS technology often includes a 5.5-megapixel sensor to enable not only a large(r) field of view but with even higher resolution, without compromising read noise, dynamic range or frame rate. Furthermore, such a sensor is capable of achieving 100 full frames/sec with a read noise down to 1.3 electrons rms, all of which would be beneficially employed with any of the embodiments disclosed herein.

Figures 3A, 3B, 3C:
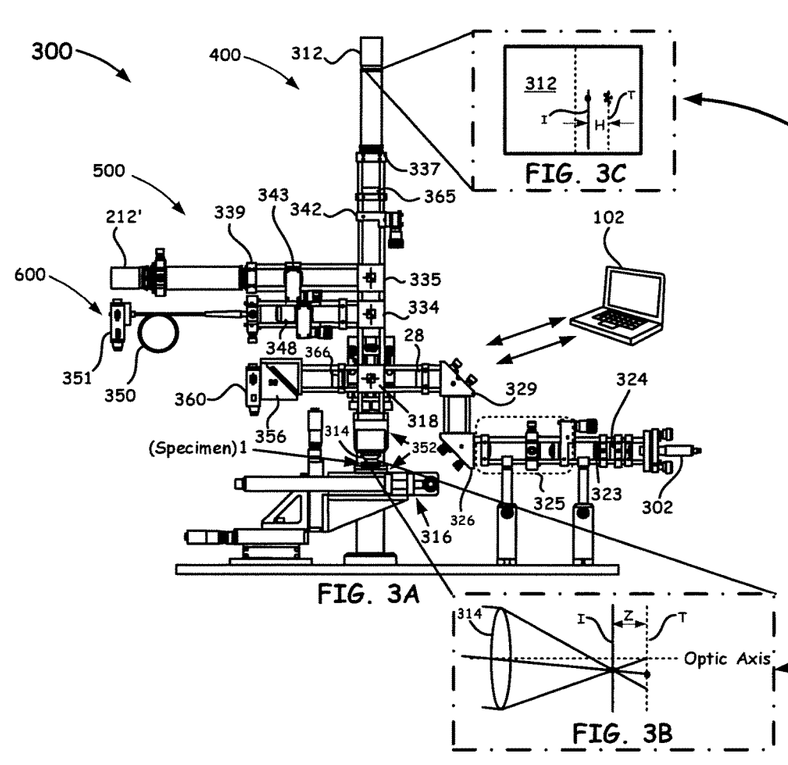
FIG. 3A shows an additional embodiment of a modular scanning confocal optical microscope (COP) with digital image processing capabilities.
FIG. 3B shows an off-axis focusing/imaging technique to enable any of the microscope embodiments herein to stay on focus while simultaneously imaging/processing.
FIG. 3C shows the general principle of the CCD array image translating and defocusing (signal intensity drop-off) based on the off-axis focusing/imaging technique shown in FIG. 3B.

Turning now to FIG. 3A, the embodiment shown is another example configuration with greater component detail of a modular scanning confocal optical microscope (COP) with digital image processing capabilities, as generally referenced by the numeral 300. Discussion for FIG. 3A will generally describe components and detail more of the configuration in the Example discussed below.

Therefore, as shown in FIG. 3A, the digital confocal optical microscope 300 often includes an illumination source 302, one or more photo detectors 306 and 308, (to include a photodetector configured as a CCD 312). Other components include an objective lens 314 and a dichroic beam splitter 318 (to include if desired an AOBS as discussed above). In certain embodiments, the digital confocal optical profile microscope 300 can optionally include a translation stage, as similarly discussed above for FIG. 1A configured to carry and move specimen 1 relative to the objective lens 314 along at least one of the x-, y-, or z-axis.

The digital confocal optical microscope 300 can also include a controller/data processor 102, as similarly discussed above, that is operatively coupled to all controllable components, such as, for example the illumination source 302, the photo detectors 306 and 308, and/or the configured movable stage components (e.g., PZT stages 311 and translation stages 316). In other embodiments, the digital confocal optical profile microscope 100 can further include scanning mirrors and/or other suitable optical components configured to focus illumination onto the specimen 1 at a specific (x,y) location. In further embodiments, the digital confocal optical profile microscope 300 may also include frames, ocular lenses, diaphragms, and/or other suitable mechanical/optical components, as somewhat detailed in the Example below.

The illumination source 302 (as similarly discussed above for the embodiment of FIG. 1) can include an electromagnetic source, such as, but not limited to, a laser, a light emitting diode, a laser diode, a halogen lamp, a mercury lamp, and/or and other suitable types of light source configured to produce an illumination beam (not shown) with the desired optical properties. The illumination beam may be manipulated, as understood b those skilled in the art, to have beam shape parameters that are often spherical but can also include, flat and/or other suitable profiles.

The beam splitter 318 (to include, for example, an AOBS) is positioned to receive the illumination beam from the illumination source 302. As is in a preferred mode of operation, the beam splitter 318 is configured to direct the illumination beam (not shown) provided by source 302 toward specimen 1 via the use of the objective lens 318, as similarly discussed above for FIG. 1A. The beam splitter 318 is also positioned to receive a reflected beam and/or a fluorescing beam (not shown) from the specimen 1 as directed by the objective lens 318 and/or any other interceding optical components, e.g., such as a tube (relay) lens (not shown), as also discussed above for FIG. 1A. The beam splitter 54 is then configured to direct the received beam (reflected beam and/or a fluorescing beam) toward the photo detector CCD array 312 and/or any other optical detector element (e.g., photo-detectors 306, 308), as to be discussed in detail in the Example discussion below.

The beam splitter 318 can include an uncoated optical components, a coated spitter (e.g., an e-beam deposited layered coating(s) splitter or any layered coated optic to provide for multiwavelength selectivity (e.g., a dichroic)), a cube splitter, a half-silvered mirror, a prism, and/or other suitable components. As discussed above, the beamplitter 318 can also be a configured Acousto Optical Beam splitter (AOBS) when desired.

It is to be appreciated that the digital confocal optical profile microscope 100 does not necessarily include a physical pinhole as the CCD in a novel fashion resides where the pinhole would typically be configured in a standard Confocal arrangement for directly detecting the signal beam(s) optical information. The $CCD_1$ array 312, as discussed below for the example, often as discussed above, includes any desired two-dimensional charge coupled array to include complementary metal-oxide-semiconductor ("CMOS") detectors, EMCCD and sCMOS technologies, etc.

The coupled array detector (CCD) 312 in FIG. 3A, as similarly noted above for the embodiment of FIG. 1A, is capable of being configured with a detection area designed to be equal to or larger than a cross-sectional area of a received beam signal. Often, the area itself for the detector is at least 5 times greater than the area of a received beam signal. The array detector (CCD) 312 may also be configured with motorized control (e.g., stepper control (not shown)) so as to move along at least one of an x-, y-, or z-axis such that the array detector (CCD) 312 can maximize imaging of a specimen 1 in a confocal manner. However, it can also be spaced apart from the designed focal imaging plane provided by system 300 for other desired techniques. As a result, a fraction of the detection area of the photo detector 90 and 70 filled by the signal beam may be increased to a target value (e.g., about 0.01, about 0.02, about 0.03, about 0.04, about 0.05, about 0.06, about 0.07, about 0.08, about 0.09, or about 1.0).

In further embodiments, the digital confocal optical profile microscope 300 may be configured to operate under confocal mode and/or a confocal profile mode. In such implementation, the two modes may be operated independently or concurrently (e.g., in parallel). For example, the digital confocal optical profile microscope 300 may include a retractable pinhole (not shown). Under the confocal mode, the retractable pinhole may be positioned between the array detector (CCD) 312 to filter or at least reduce out of focus signals. Alternatively, under the confocal profile mode, the retractable pin hole may be removed from the optical path between the array detector (CCD) 312 so as detect a profile of the signal beam.

Another very beneficial arrangement that is capable of being incorporated into any of the modular confocal microscopes disclosed herein is shown in FIG. 3B and FIG. 3C. In general, without being bound by theory and using the confocal microscope 300 for illustration purposes of the technique, the input source light (e.g., laser source 302) used for illumination/imaging can be directed slightly (e.g., up to about a degree) non-co-linearly with respect to the optical axis (denoted as a dashed line) of the objective lens 314 and any other collection/focusing optics where warranted using for example, manual steering 326, 327 so as to initiate imaging of the specimen/sample desired to be optically interrogated/conditioned.

Because of such a configuration in referring to FIG. 3B, a sample plane (I) originally so imaged but thereafter translated (see plane denoted as T) and/or titled a distance Z will result in images that exhibit loss of intensity (e.g., via defocusing) and will also exhibit translation in (x,y) as evidenced in a shift pixel number(s) (see FIG. 3C) at the configured CCD array 312 (see FIG. 3C). Such a novel technique is beneficially used by the microscope configurations herein to maintain focus and mitigate data collection imperfections. In particular and beneficially, if the initially imaged site of the sample for any reason translates (e.g., in a plane that moves in the Z-direction with respect to for example, the confocal microscope focusing objective) or if during scanning, the surface of the scanned area is uneven, such events can be autocorrected so as to maintain proper focus and thus imaging in real time by monitoring pixel offsets and signal intensity drop-off, often due to defocusing while the microscope is in operation.

Having now generally provided the disclosure, the same will be more readily understood through reference to the following examples which are provided by way of illustration and are not intended to be limiting of the disclosure, unless specified.

EXAMPLES

The light source module was a collimated laser diode 302 of 4.5 mW at 532 nm wavelength. A beam attenuation unit made of a Glan-Taylor polarizer P1 323 and a half waveplate 324 is used to adjust the incident laser power. A Keplerian type beam expander 325 expands the laser beam to slightly overfill the back aperture of the microscope objective 314 (Zeiss LD Plan-Neo fluor 20×/0.4 Corr). A 50 μm diameter confocal pinhole (not detailed) is inserted at the internal focal point acting as a spatial filter. The expanded beam is then guided into the main microscope optical train by a first beam steering mirror 326, and a second beam steering mirror 327 through often a first density filter 329 and a beam splitter cube 318 (or a dichroic mirror, such as an AOBS). The reflected (or emitted) light is then directed by various beam splitter cubes 334, 335 into the camera detection modules 400, 500 and fiber-optic detection module 600.

Camera module 400 includes an arrayed detector $CCD_1$ 312 (The Imaging Source, DMK 23U618 monochrome camera) in the vertical arm so as to collect the reflected and/or emission (e.g., fluorescence) light pattern, saved often as a 640×480 resolution bitmap for later image processing. A line filter 337 at 532 nm (or notch filter) is placed in front to only let reflected laser light pass through. Camera module 500 includes an arrayed detector $CCD_2$ 312' (The Imaging Source, DFK 23U274 color camera) in the horizontal arm that is used for wide field inspection and initial positioning, and a notch filter 339 at 532 nm (or line filter) was used to keep laser light from entering the camera. A 200 mm focal length tube lens 342, 343 is used in both arms.

A fiber detection module 600 uses a 4× Olympus microscope objective 348 to couple light into a 25 μm diameter multimode fiber 350, which acts as a confocal pinhole with transmitted light collected by a photodetector 351. The motion module uses a piezoelectric objective scanner (Physik Instrumente, PIFOC1 P725.4CD) for vertical scan, and a piezoelectric nano positioning stage (Physik Instrumente, P-611.2S) for lateral scan (both denoted as 352). A motorized scan table (Physik Instrumente, KT-120) and a 3-axis manual stage (both generally denoted as 316) are used for large area translation. In addition, a shearing interferometer 356 is used for beam collimation and intensity monitoring via a photodetector 360. Additional optical neutral density filters (e.g., 365, 366) are positioned where warranted.

Often, but not necessarily, sample scanning is used instead of laser scanning because the design is optically simple and less susceptible to optical aberrations. Additionally, the field of view (FOV) of a sample scan microscope can be independently chosen without changing the microscope's optical design. By selecting a region of interest (ROI) on recorded images, a virtual pinhole (using $CCD_1$ 312 and/or $CCD_2$ 312') can be created. The ROI only includes the pixels corresponding to the diffraction limited spot on the sample plane, which abides by the confocal principle. Often, as described hereinafter, a square pinhole of N×N pixels is utilized as the virtual pinhole (synthetic aperture) with the choice of the N value also discussed below. Beyond a virtual pinhole, the image was analyzed to bring out additional contrast. Once the scan is completed, the recorded images were stored in the same order as their spatial coordinates. Then computer algorithms are used to deconvolve information from the recorded images.

Two-Dimensional Scan

To illustrate a working mode using the embodiment described above, a two-dimensional scan was initiated of a 100 μm×100 μm area on a 3 mm×3 mm chip carrier specimen 1 with total scan points of 200×200 at a 0.5 μm step size along both X and Y. Final images were obtained over a ROI of N×N pixels on $CCD_1$ 212 recorded images. The Nyquist-Shannon sampling theorem requires at least two pixels per resolvable element. A square pinhole of 2×2 pixels was chosen initially. Additional cropping sizes (N=6, 11, 21, 31, 41, 51, 101) were used to determine the optimal pinhole size for the imaging. As a comparison, a fiber-optic module was utilized to represent the standard confocal signal detection. A 25 μm diameter multimode fiber 350 was used to collect reflected light from the same field of view.

As an example method of utilizing the microscope 300, a calibration process is often performed before a specimen 1 is scanned. This step is carried out to ensure that the fiber facet and the CCD are in a conjugate planes to the focal plane of the objective lens.

Figure 4:
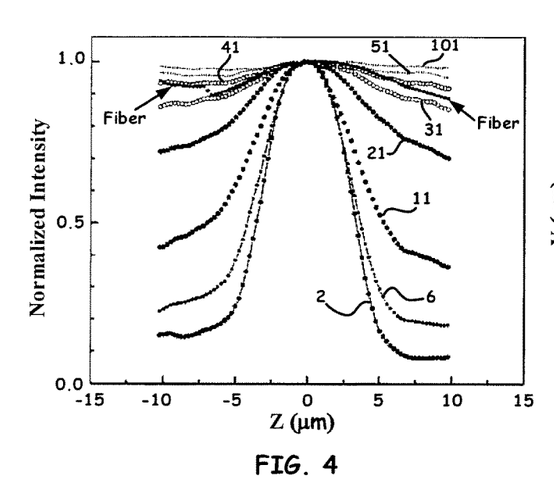
FIG. 4 shows measured axial response curves of the fiber-optic detection curve and the CCD based detection pixel cropping sizes.

FIG. 4 shows example measured axial response curves of the fiber-optic detection curve (denoted as Fiber) and the CCD based detection pixel cropping sizes (denoted with actual pixel synthetic aperture sizes N=(6, 11, 21, 31, 41, 51, 101)) data also shown. These relatively symmetrical plots share a common axial zero/focal point (at Z~0) to enable user confidence that they are optically aligned to the same conjugate plane. It is noted that the fiber-optic response curve (Fiber) is relatively broader than those in the CCD plot up to 31×31. In the CCD plots, the width of the curve increased with the crop size. The full width at half maximum (FWHM) is 7 μm for N=2, and 25.72 μm for N=21. Beyond N=31×31, a well-defined peak is not found.

Figure 5:
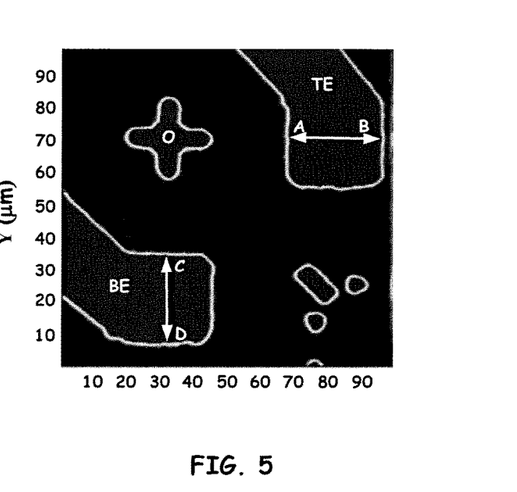
FIG. 5 shows an image of a chip carrier specimen by fiber-optic confocal scan. In particular, the image is of a 100 μm×100 μm area on a 3 mm×3 mm chip carrier obtained by plotting the acquired intensity map from fiber-optic detection.

An intensity map revealing the geometric profile of the specimen 1 from the fiber-optic confocal scan is shown in FIG. 5, with the polarity marker (O), the width marker AB for the top electrode (TE) and the width CD for the top electrode (BE) denoted as to be discussed below. In particular, FIG. 5 shows an image of a chip carrier specimen 1 using the embodiment of FIG. 3, although the embodiment of FIG. 1 is equally capable of imaging such a specimen with like results.

Figure 6A:
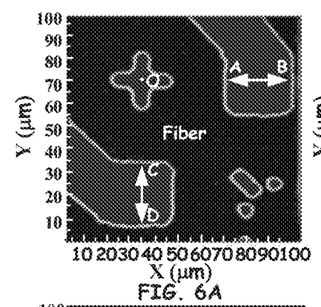
FIG. 6A shows Fiber imaging to compare with CCD based detection results.
Figure 6B:
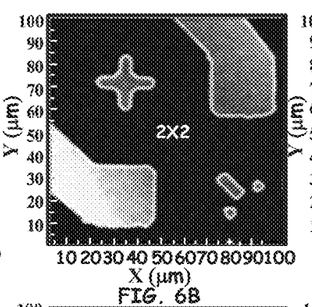
FIG. 6B shows CCD based detection results of a 2×2 N pixel crop size.
Figure 6C:
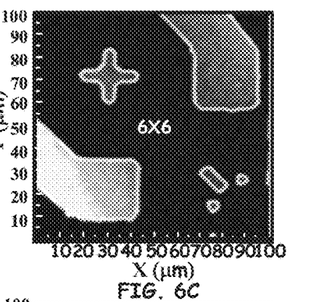
FIG. 6C shows CCD based detection results of a 6×6 N pixel crop size.
Figure 6D:
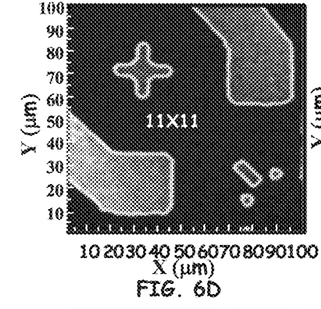
FIG. 6D shows CCD based detection results of a 11×11 N pixel crop size.
Figure 6E:
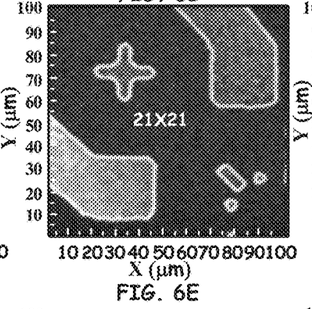
FIG. 6E shows CCD based detection results of a 21×21 N pixel crop size.
Figure 6F:
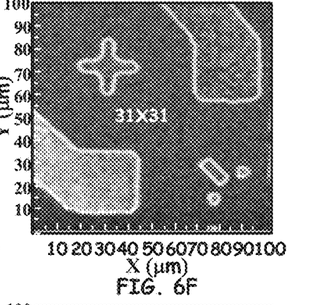
FIG. 6F shows CCD based detection results of a 31×31 N pixel crop size.
Figure 6G:
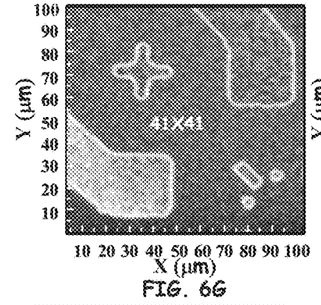
FIG. 6G shows CCD based detection results of a 41×41 N pixel crop size.
Figure 6H:
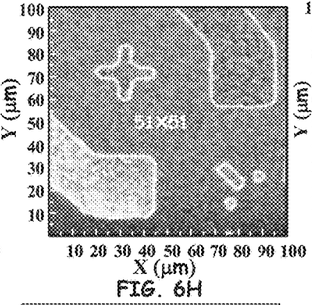
FIG. 6H shows CCD based detection results of a 51×51 N pixel crop size.
Figure 6I:
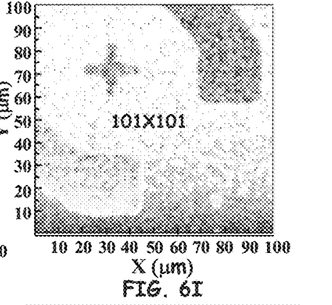
FIG. 6I shows CCD based detection results of a 101×101 N pixel crop size.

The CCD based detection results are shown in FIGS. 6A-6I. In particular, FIG. 6A shows the Fiber imaging, FIG. 6B shows a 2×2 pixel N crop size (synthetic aperture), FIG. 6C shows an N=6×6 pixel crop size (synthetic aperture), FIG. 6D shows an N=11×11 pixel crop size (synthetic aperture), FIG. 6E shows a 21×21 N pixel crop size (synthetic aperture), FIG. 6F shows a 31×31 N pixel crop size (synthetic aperture), FIG. 6G shows a 41×41 N pixel crop size (synthetic aperture), FIG. 6H shows a 51×51 N pixel crop size (synthetic aperture), and FIG. 6I shows an 101×11 N pixel crop size (synthetic aperture). It is important to note that the images have clarity with best or acceptable resolution from a 2×2 pixel array size up to about a 21×21 pixel array synthetic aperture, which is in agreement to the FIG. 4 response curves results. However, it is important to note that while 2×2 pixel array size up to about a 21×21 pixel size arrays (i.e., synthetic apertures) are beneficial, Case 6×6 (e.g., see FIG. 6C) gives the closest match to the 2×2 case (e.g., see FIG. 6B), and still maintains a sizeable amount of pixels.

Thus, as to be iterated below, a 6×6 array of pixels (e.g., see FIG. 6C) is a preferred optimal pinhole size for three-dimensional scans which require more complex analysis and the best performance, but the 21×21 (e.g., see FIG. 6E) as the pinhole array size for two-dimensional scans which requires a meaningful comparison between fiber and CCD experiments and less computational overhead. Also of note is that by manual control of the PI-611. 2S piezoelectric stage to translate across the width of the top-right (TE) and bottom-left electrodes (BE), as shown and denoted in FIG. 5, a visual estimate of the electrode width AB and CD were obtained when the laser spot vanished at the opposite edges in the inspection camera $CCD_2$, i.e., AB, 28-29 μm, CD, 27-30 μm.

As an alternative embodiment but objective approach, a computer program was written to calculate the average width of the top-right and bottom-left electrodes, AB (TE) and CD (BE), instead of a discrete set of hand-picked line pairs. Such a program first calculates a threshold to completely separate the gold-plated electrodes and markers from the substrate, and then computes the width of the electrodes above this threshold at each X or Y position.

Figure 7A:
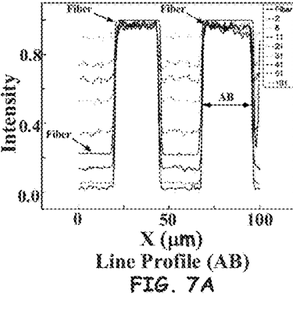
FIG. 7A shows an intensity profile of a horizontal line passing through a polarity marker O so as to show the horizontal width of the polarity marker and the electrode (AB) of different pinhole sizes at a specific Y position.
Figure 7B:
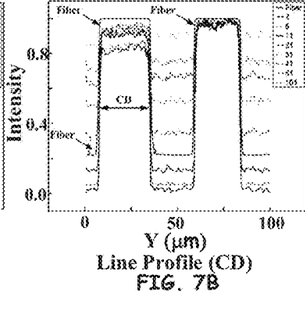
FIG. 7B shows an intensity profile of a vertical line passing through the polarity marker O so as to show the vertical width of the polarity marker and the electrode (AB) of different pinhole sizes at a specific X position.
Figure 7C:
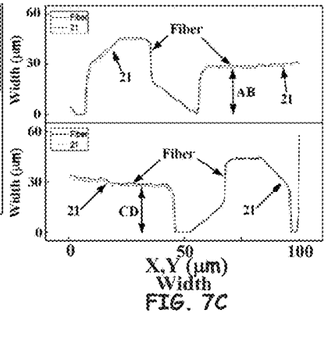
FIG. 7C shows full width profiles of electrodes across the entire X and Y ranges measured in the fiber-optic case and the CCD case with a pinhole size of 21×21 pixels.

Turning to FIG. 7A, FIG. 7B and FIG. 7C, FIG. 7A shows an intensity profile of a horizontal line passing through the polarity marker O (See FIG. 5) so as to show the horizontal width of the polarity marker and the electrode (AB) of different pinhole sizes at a specific Y position, FIG. 7B shows an intensity profile of a vertical line passing through the polarity marker O (again refer to FIG. 5) so as to show the vertical width of the polarity marker and the electrode (AB) of different pinhole sizes at a specific X position, while FIG. 7C shows full width profiles of electrodes across the entire X and Y ranges measured in the fiber-optic case and the CCD case with a pinhole size of 21×21 pixels. Thus, an array of width values is obtained.

The upper half of FIG. 7C represents maximum horizontal width of the electrodes at each Y position. The lower half of FIG. 7C represents maximum vertical width of electrodes at each X position. Intensity profiles of horizontal and vertical lines passing through the center of the polarity marker (O) in FIG. 7A and FIG. 7B show a decrease of contrast and an increase of noise with the increase of pinhole size. The diffraction limited spot diameter in the focal plane of the objective lens (e.g., a Zeiss LD Plan Neofluor 20×/0.4 Corr) is 1.62 μm at 532 nm. It is projected by the digital confocal optical microscope 300 optics on to an area of diameter 39.56 μm on the CCD, which is enclosed by 7×7 pixels. The projected area on the fiber facet 350 in the fiber-optic detection arm 600 is of diameter 8.9 μm. Thus, the 25 μm diameter multimode fiber 350 core encloses 2.81×Airy units (AU), which corresponds to an equivalent area of 20×20 pixels on the CCD.

The Case N=2×2, (e.g., see FIG. 6B) which is at the size limit of point detection by a CCD, shows the least amount of deviations in the width measurement. Larger pinhole sizes, 6×6 (e.g., see FIG. 6C) and 11×11 (e.g., see FIG. 6D), shows slightly larger width values, but maintains comparable standard deviation values to the 2×2 case. Case N=21×21 (e.g., see FIG. 6E) shows slight noise increase. Above N=31×31 (e.g., see FIG. 6F), the noise level increases drastically, and the resolution decreases as seen from the fact that the edge profiles of the bottom-right position markers become more and more rounded. Case N=101×101, which corresponds to wide field imaging, shows the largest standard deviations and the highest noise level.

The increase of noise in the larger pinhole cases is attributed to the inclusion of more non-photon-receiving pixels subject to read noise and dark current noise outside the diffraction limited spot, which increases the overall noise level of the reconstructed image. The fiber-optic case shows larger numerical values due to its moderate core diameter size. It is to be appreciated that in theory, an infinitesimal pinhole could give the best spatial resolution, but such a small pinhole in reality also rejects photons which could have been used to counter the noise.

However, as stated above, the 6×6 case (e.g., see FIG. 6C) gives the closest match to the 2×2 case (e.g., see FIG. 6B), and still maintains a sizeable amount of pixels. Thus, a 6×6 (e.g., see FIG. 6C) is a preferred optimal pinhole size for three-dimensional scans which require more complex analysis and the best performance, but the 21×21 (e.g., see FIG. 6E) as the preferred pinhole size for two-dimensional scans which requires a meaningful comparison between fiber and CCD experiments and less computational overhead.

Persistent Photoconductivity

Turning now to a process for processing/conditioning materials that exhibit persistent photoconductivity. Annealed strontium titanate (SrTiO3 or STO) single crystals exhibit persistent photoconductivity (PPC) at room temperature. Illumination with sub-gap light using, for example, the modular confocal embodiment shown in FIG. 3A, reduces the resistance by three orders of magnitude, which persists for up to a year or longer. The results from IR spectroscopy and two-point resistance measurements indicate that water vapor at 1200° C. yields hydrogen and oxygen-vacancy populations that result in large PPC. Deuterium substitution experiments evidenced a two-hydrogen center that forms after exposure to light. Accordingly, the sub/band gap light (at least 2.9 eV (e.g., 450 nm) administered using a confocal arrangement disclosed herein causes substitutional hydrogen to leave the oxygen site, forming metastable O—H bonds.

In particular, specific annealing treatments induced persistent photoconductivity (PPC), wherein samples (specimens 1) treated with light of energy 2.9 eV or higher went from insulating to conductive. The conductivity change is three orders of magnitude, occurs at room temperature, and is stable on time periods that are a year or greater. The surprising and unexpected increase in conductivity was confirmed by electrical measurements (see FIG. 8) as well as the increase in free carrier absorption in the infrared (IR) region of the spectrum.

As a novel and beneficial embodiment, precise conductive paths down to the diffraction limited spot size of the objective using for example, a modular confocal arrangement disclosed herein, can be drawn with light on a resistive sample. The specimen 1, can be monitored (imaged) using the autofocusing means disclosed above so as to ensure precision as to desired conditioned areas. Accordingly, the process using the embodiments herein induce PPC, i.e., conductivity. When conductivity is elevated, the charge at the surface of the material, to include a number of other semiconductor materials (e.g., Gallium Nitride), increases. Such a process enables the PPC technique to be coupled with photo-lithographic and other semi-conductor applications and the like to include deposition of cation conductive materials (e.g., $Ag^{+1}$) at the conditioned sites. An additional application includes bioelectronics applications as upon PPC conditioning of the semiconductor substrate, desired cells having a particular charge will adhere to the surface of a conditioned PPC material.

Figure 8:
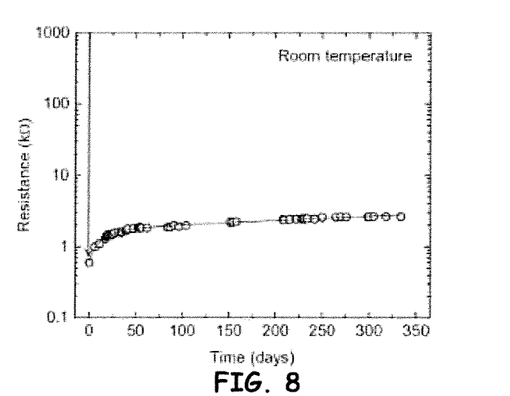
FIG. 8 shows resistance of an STO sample after exposure to 405 nm light. Measurements were taken in the dark. The resistance of the sample prior to illumination was ~1 MX.

FIG. 8 shows two-point resistance measurements of an STO sample that was ~1 MΩ of resistance prior to light exposure. After illumination with 405 nm light, the resistance dropped to ~1 kΩ. The resistance was measured in the dark at least 1 year. The data were fitted empirically to a sum of two exponential functions with time constants of 17 days and 800 years. The long-time behavior indicates that the resistance change is surprisingly and unexpectedly essentially permanent at room temperature.

To achieve large PPC, SrO powder is placed in a sealed ampoule, along with the STO sample, and annealed at 1200° C. in vacuum. Annealing in vacuum prior to the "SrO" anneal is often a beneficial step to condition the crystals. The vacuum anneal introduces oxygen vacancies so as to induce PPC. The presence of hydrogen and oxygen during the 1200° C. anneal is beneficial for PPC.

Again the following examples are provided by way of illustration and are not intended to be limiting of the disclosure, unless specified.

EXAMPLES

Experimental Methods

The annealing recipe for inducing PPC in STO involves sealing a bulk single crystal of STO in a fused silica ampoule with 0.5 g strontium oxide (SrO) powder under rough vacuum. The sample space inside the ampoule had a length of approximately 7.6 cm and a diameter of 1.6 cm. The ampoule was annealed in a horizontal tube furnace for 1 h at 1200° C. Samples are promptly removed and allowed to cool in the ambient air in the dark, which takes about 10 min. IR spectra were obtained using a Bomem DA8 vacuum Fourier transform infrared (FTIR) spectrometer. Powder spectra were taken at room temperature using a mercury cadmium telluride (MCT) detector. Low temperature spectra were taken using a Janis closed-cycle helium cryostat at a resolution of 1 $cm^{-1}$, with an indium antimonide (InSb) detector.

A 405 nm light emitting diode (LED) was placed inside the cryostat to allow exposure to occur without moving the sample or breaking vacuum. Anhydrous $Sr(OH)_2$ and SrO powders were purchased from Sigma-Aldrich. Deuterated strontium hydroxide, $Sr(OD)_2$, was prepared by placing SrO powder and heavy water ($D_2O$) in a sealed container (humidity chamber) for 2 days. $D_2O$ formed heavy water vapor in the chamber, which was readily absorbed by strontium oxide, forming $Sr(OD)_2$. The mass of the powder was weighed before (1.0 g) and after (1.8 g) being in the humidity chamber. The corresponding increase in mass indicated that the powder absorbed ~4 $D_2O$ molecules per SrO.

Results

SrO Powder

The presence of SrO powder during the 1200° C. anneal was found to be important for large PPC. Other ambient conditions, such as annealing in Ar without any powder, resulted in a highly n-type material. A 1200° C. anneal was performed using newly received SrO powder. Rather than being in a high resistance state after annealing and before light exposure, samples were conductive (~300× with 2 point pressed indium contacts). This indicated that SrO powder must age in the ambient atmosphere in order to yield optimal PPC.

Figure 9:
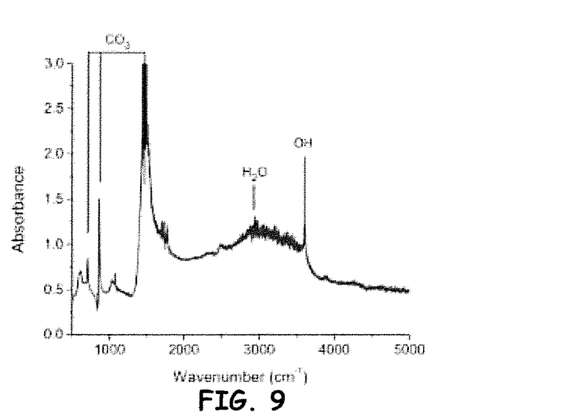
FIG. 9 shows an absorption spectrum of SrO powder after exposure to the atmosphere for 6 days, mixed with KBr. Freshly opened SrO powder mixed with KBr was used as a reference.

SrO powder was mixed with KBr, to be sufficiently transparent, and pressed into pellets. The material from a newly opened bottle was compared with the material that experienced 6 days of exposure to the atmosphere. Several additional IR peaks appear in the sample exposed to air (see FIG. 9) and are attributable to strontium hydroxide, $Sr(OH)_2$ or $Sr(OH)_2 \cdot nH_2O$, as well as strontium carbonate, $SrCO3$. The $CO_3^{2-}$ anion has a broad absorption band centered at around 1445 $cm^{-1}$, attributed to the asymmetric stretching vibration, while the 866 and 599 $cm^{-1}$ lines are the bending vibrations. The peak at 3590 $cm^{-1}$ is due to the stretching mode of $OH^{-1}$ in $Sr(OH)_2$, while the broad absorption centered at around 2835 $cm^{-1}$ is attributed to the stretching mode of $H_2O$ in $Sr(OH) \cdot 2 nH2O$. This shows that SrO absorbs water and carbon dioxide, which may be released during the high temperature anneal.

Strontium Hydroxide

Evidence for PPC

Strontium hydroxide is a contaminant species in SrO powder. To test the effect of strontium hydroxide on PPC, a small amount (0.1 g) of anhydrous $Sr(OH)_2$ was placed in the ampoule, without any SrO. To prevent premature decomposition of the strontium hydroxide powder during the sealing process with a hydrogen-oxygen torch, the powder was placed in a heat-sinked end of the ampoule. The sample was then annealed. At 1200° C., $Sr(OH)_2$ decomposes into SrO and $H_2O$.

Figure 10:
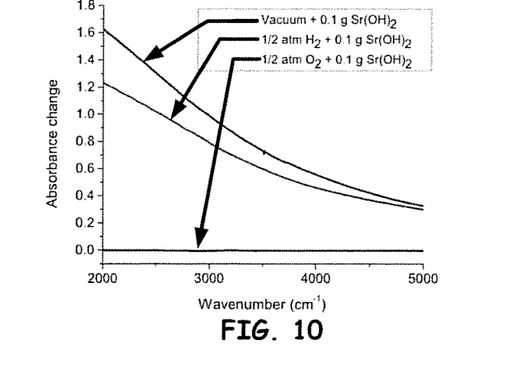
FIG. 10 shows Low temperature (125K) IR spectra of STO annealed with 0.1 g $Sr(OH)_2$ under vacuum or ½ atm hydrogen or oxygen gas. Spectra before light exposure were used as the reference for the absorbance plots.

This sample exhibits PPC, as measured by two methods. First, light exposure caused a dramatic decrease in the transmitted light intensity through the sample, which corresponds to a large increase in the free carrier absorption (FIG. 10). Second, the 2-point resistance of the sample at room temperature, using pressed indium contacts, decreased by a factor of 400 as shown in TABLE 1.

TABLE I

Summary of 2-point pressed indium resistance values taken before and after light exposure for various sample conditions.

| Annealing conditions | Resistance before light exposure | Resistance after light exposure |
|---|---|---|
| $Sr(OH)_2$ | 4 MΩ | 118 kΩ |
| $Sr(OH)_2$ + ½ atm $H_2$ | 300 kΩ | 1.2 kΩ |
| $Sr(OH)_2$ + ½ atm $O_2$ | >200 MΩ | 200 MΩ |
| $Sr(OD)_2$ | 99 MΩ | 3.0 kΩ |
| $Sr(OH)_2$ + $Sr(OD)_2$ | 38 MΩ | 83 kΩ |
| $H_2O$ | >200 MΩ | 96 kΩ |
| $CO_2$ | 33 kΩ | 172 Ω |

This result demonstrates that water vapor at high temperatures can induce PPC. To further explore the role of water and its components, the evacuated ampoule was back-filled with approximately 0.5 atm of either hydrogen or oxygen along with 0.1 g of $Sr(OH)_2$ powder. The sample annealed in the hydrogen rich atmosphere showed PPC (see FIG. 10). The PPC is less dramatic than the evacuated-ampoule anneal, with a 2 order of magnitude resistance change (Table I). Hydrogen is a reducing atmosphere and could cause more oxygen vacancies to be introduced, thereby lowering the resistance of the beforelight state by introducing more free carriers. The oxygen rich atmosphere, in contrast, did not show PPC (FIG. 10). This is consistent with results that oxygen vacancies are important for PPC. Additional oxygen during the anneal suppresses the formation of oxygen vacancies, resulting in a resistive material that is not photo-sensitive.

Water

Figure 11:
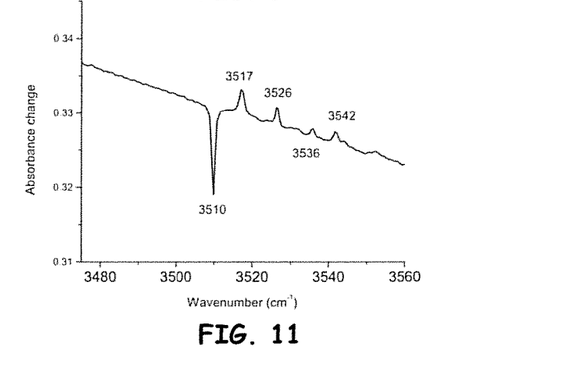
FIG. 11 shows Low temperature (125K) IR spectra of STO annealed in water vapor. The spectrum before light exposure was used as the reference.

The results from the $Sr(OH)_2$ anneals suggest that water vapor is also important for PPC. To test this further, STO was annealed under water vapor without any powder. To minimize the evaporation of water under vacuum, 0.04 g of water was frozen and placed the ice inside a heat-sinked ampoule with the sample. Approximately half the water remained after sealing, which corresponds to a pressure of around 10-15 atmospheres of water vapor during the anneal. This ampoule was annealed under the standard conditions. The sample displays PPC, which shows that water vapor alone is responsible for PPC (FIG. 11). The hydrogen lines are similar to those observed in the $Sr(OH)_2$ anneal, except that the weak line at 3531 $cm^{-1}$ is not observed and an additional satellite line is observed at 3542 $cm^{-1}$.

Table I as shown above listed a summary of the annealing conditions and 2-point resistance measurements before and after light exposure. Deuterium substituted samples start in a higher resistance state before exposure to light. The pressure of water vapor during the anneal is correlated with the resistance value observed before light exposure. This may be because water has a very slight oxidizing effect, which will decrease the number of oxygen vacancies present. On the basis of these measurements, a model for PPC is as follows. For "hydrogen rich" anneals at 1200° C., the sample contains (VSr–H) and HO impurities.

Upon exposure to light, hydrogen moves from the oxygen site and forms (VSr–2H), liberating two electrons as follows:

This results in a decrease in the (VSr–H)⁻ IR absorption peak ($H_1$) and an increase in the sidebands $(VSr–2H)^0$. For the hydrogen-poor $CO_2$ anneal, most Sr vacancies are unpassivated. The PPC reaction is then given by:

This leads to an increase in the (VSr–H)⁻ peak and no (VSr–2H)⁰ sidebands. The proposed model is one non-limiting explanation for the experimental observations. It is possible that some of the O—H bonds observed in the IR are not due to vacancy-hydrogen complexes. They could, for example, be acceptor-hydrogen pairs. In that case, electrons would also be liberated. The main point is that when H leaves its substitutional site, the oxygen vacancy is able to act as a shallow double donor. The formed O—H bonds are strong enough to prevent the hydrogen atoms from returning to their substitutional sites at room temperature.

I claim:

1. A modular confocal microscope, comprising:
a source of electromagnetic radiation;
a beam steering means arranged to direct the source of electromagnetic radiation non-collinearly with the optical axis of a focusing lensing means configured within the modular confocal microscope, wherein the focused non-collinearly directed source of electromagnetic radiation is used for an imaging basis of targeted one or more sites of a specimen; and
at least one arrayed detector configured along a beam path in a conjugate confocal plane to the targeted one or more sites of a specimen and further configured to provide autocorrection information to maintain focus and image quality of the targeted one or more sites using the imaging basis, and wherein the arrayed detector provides high-throughput configured synthetic apertures in a pixel range array of at least an N=2×2 array; and
a processor coupled to the at least one arrayed detector configured to determine 2-dimensional and/or 3-dimensional properties of the targeted one or more sites of the specimen.

2. The modular confocal microscope of claim 1, wherein the configured synthetic apertures are in a pixel range array of an N=2×2 up to an array of N=101×101.

3. The modular confocal microscope of claim 1, wherein the configured synthetic apertures are in a pixel range array of an N=2×2 up to an array of N=21×21.

4. The modular confocal microscope of claim 1, wherein a steering mirror or an x-y-z stage coupled to the processor is directed to scan the specimen.

5. The modular confocal microscope of claim 1, wherein the at least one arrayed detector is a two-dimensional arrayed charge coupled detector (CCD).

6. The modular confocal microscope of claim 1, wherein the two-dimensional arrayed charge coupled detector (CCD) is selected from: a complementary metal-oxide-semiconductor (CMOS) an EMCCD, or an sCMOS.

7. The modular confocal microscope of claim 1, further comprising: a beam splitter selected from: a long pass dichroic mirror beam splitter, a cube splitter, a half-silvered mirror, a prism, ans an Acousto Optical Beam splitter (AOBS).

8. A modular microlens array confocal microscope, comprising:
a source of electromagnetic illumination;
a microlens array arranged to receive the source of electromagnetic illumination, wherein the received source of electromagnetic illumination is reconfigured by the microlens array into a plurality of sub-beams running adjacently along a first beam path;
an optical lensing means configured to collect and focus the plurality of sub-beams at a plurality of sites at a target, wherein the optical lensing means thereafter collects and directs along a second beam path, an induced reflectance and/or emission from each of the plurality of targeted sites;
at least one arrayed detector configured along the second beam path and further configured to image the resultant multiple sites via the induced reflectance and/or emission provided by the signals from the focused plurality of sub-beams, and wherein the arrayed detector provides high-throughput configured synthetic apertures in a pixel range array of at least an array of N=2×2; and
a processor coupled to the at least one arrayed detector and configured to determine 2-dimensional and/or 3-dimensional properties of the target.

9. The modular microlens array confocal microscope of claim 8, wherein the configured synthetic apertures are in a pixel range array of an N=2×2 up to an array of N=101×101.

10. The modular microlens array confocal microscope of claim 8, wherein the configured synthetic apertures are in a pixel range array of an N=2×2 up to an array of N=21×21.

11. The modular microlens array confocal microscope of claim 8, further comprising:
a beam steering means arranged to direct the source of electromagnetic radiation non-collinearly with the optical axis of the optical lensing means, wherein the focused non-collinearly directed source of electromagnetic radiation is used for an imaging basis of targeted one or more sites of a specimen; and
at least one arrayed detector configured along a beam path in a conjugate confocal plane to the targeted one or more sites of a specimen and further configured to provide autocorrection information to maintain focus and image quality of the targeted one or more sites using the imaging basis.

12. The modular microlens array confocal microscope of claim 8, further comprising: a beam splitter selected from: a long pass dichroic mirror beam splitter, a cube splitter, a half-silvered mirror, a prism, and an Acousto Optical Beam splitter (AOBS).

13. A process for conditioning a material using a modular confocal microscope so as to induce persistent photoconductivity (PPC), comprising:
incorporating a modular confocal microscope for simultaneously imaging and conditioning one or more targeted sites of a specimen that exhibits persistent photoconductivity, wherein the modular confocal microscope includes:
a source of electromagnetic radiation;
a beam steering means arranged to direct the source of electromagnetic radiation non-collinearly with the optical axis of a focusing lensing means configured within the modular confocal microscope, wherein the focused non-collinearly directed source of electromagnetic radiation is used for an imaging basis of targeted one or more sites of a specimen; and
at least one arrayed detector configured along a beam path in a conjugate confocal plane to the targeted one or more sites of a specimen and further configured to provide autocorrection information to maintain focus and image quality of the targeted one or more sites using the imaging basis, and wherein the arrayed detector provides high-throughput configured synthetic apertures in a pixel range array of at least an N=2×2; and a processor coupled to the at least one arrayed detector configured to determine 2-dimensional and/or 3-dimensional properties of the targeted one or more sites of the specimen;

selecting a predetermined emission spectrum provided by the source;

irradiating an initial contact point via the confocal geometry of the confocal modular microscope; and while maintaining the irradiation, translating the specimen so as to delineate a path of exposure of the specimen to the irradiation.

14. The process for conditioning a material using a modular confocal microscope of 13, wherein the configured synthetic apertures are in a pixel range array of an N=2×2 up to an array of N=101×101.

15. The process for conditioning a material using a modular confocal microscope of 13, wherein the configured synthetic apertures are in a pixel range array of an N=2×2 up to an array of N=21×21.

16. The process for conditioning a material using a modular confocal microscope of 13, wherein the specimen that exhibits persistent photoconductivity is an oxide.

17. The process of claim 16, wherein the specimen is at least one material selected from: Strontium titanate (SrTiO3) and zinc oxide (ZnO).

18. The process of claim 13, wherein the specimen that exhibits persistent photoconductivity is a III-V semi-conductor materials selected from gallium nitride (GaN), gallium indium nitride arsenic (GaInNAs), and gallium arsenic (GaAs).

19. The process of claim 13, wherein the material exhibits persistent photoconductivity (PPC) for at least one year.

20. The process of claim 13, wherein the material is annealed at up to 1200° C.

21. The process of claim 13, wherein the material is annealed under water vapor.

22. The process of claim 13, further comprising:

adhering desired biological cells having a particular charge to the surface of the conditioned PPC material.

* * * * *